(12) United States Patent (10) Patent No.: US 12,606,247 B2

Tanigawa (45) Date of Patent: Apr. 21, 2026

(54) SIDE STRUCTURE OF VEHICLE

(71) Applicant: Honda Motor Co., Ltd., Tokyo (JP)

(72) Inventor: Masahiro Tanigawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 375 days.

(21) Appl. No.: 18/512,063

(22) Filed: Nov. 17, 2023

(65) Prior Publication Data

US 2024/0278848 A1 Aug. 22, 2024

(30) Foreign Application Priority Data

Feb. 17, 2023 (CN) .......................... 202310129135.7

(51) Int. Cl.
B62D 25/04 (2006.01)
B62D 25/06 (2006.01)

(52) U.S. Cl.
CPC ............. B62D 25/04 (2013.01); B62D 25/06 (2013.01)

(58) Field of Classification Search
CPC ........ B62D 25/04; B62D 25/06; B62D 25/02; B62D 25/07

USPC ...................................................... 296/193.06
See application file for complete search history.

(56) References Cited

U.S. PATENT DOCUMENTS

| | | | | |
|---|---|---|---|---|
| 10,449,840 | B2 * | 10/2019 | Ajisaka | ................... B60J 5/0455 |
| 2018/0222296 | A1 * | 8/2018 | Hattori | ...................... B60J 7/022 |
| 2019/0168813 | A1 * | 6/2019 | Nakamoto | ............. B62D 25/04 |
| 2019/0256154 | A1 * | 8/2019 | Kamimura | ............. B62D 25/04 |

FOREIGN PATENT DOCUMENTS

| | | | |
|---|---|---|---|
| CN | 110615040 A | * | 12/2019 |
| JP | 2573475 | | 5/1998 |

* cited by examiner

*Primary Examiner* — Muhammad Shafi

(74) *Attorney, Agent, or Firm* — JCIPRNET

(57) ABSTRACT

A side structure of a vehicle is capable of preventing water from entering an interior of a cabin. The side structure of the vehicle includes: a roof rail, which is disposed on an outer upper section of the vehicle and extends along a vehicle front-rear direction; pillars, which extend downward from the roof rail in a vehicle up-down direction; and an outer member, which covers outer sides of the roof rail and the pillars in a vehicle width direction. The outer member is formed with inclined sides that are inclined upward in the vehicle up-down direction and toward a door opening side.

9 Claims, 5 Drawing Sheets

SIDE STRUCTURE OF VEHICLE

CROSS-REFERENCE TO RELATED APPLICATION

This application claims the priority benefit of China application serial no. 202310129135.7, filed on Feb. 17, 2023. The entirety of the above-mentioned patent application is hereby incorporated by reference herein and made a part of this specification.

BACKGROUND

Technical Field

The disclosure relates to a side structure of a vehicle.

Description of Related Art

In order to provide a sustainable transport system that can be easily used by anyone (including the elderly, the disabled, children and other disadvantaged groups), efforts have been made to develop a vehicle that can improve rideability. In the existing technology, the outer member of the side structure of the vehicle is mostly formed with cutouts perpendicular to the extension direction of the pillar to guide water to flow to the outer side. However, gaps often exist at the end section of the cutline, which causes water to seep in and flow into the interior side, reducing the rideability of the vehicle. The disclosure is intended to prevent water from flowing into the interior side, thereby further improving the rideability of transportation and contributing to the development of a sustainable transport system.

SUMMARY

The disclosure provides a side structure of a vehicle that is capable of preventing water from entering an interior of a cabin.

The side structure of the vehicle of the disclosure includes: a roof rail, which is disposed on an outer upper section of the vehicle and extends along a vehicle front-rear direction; pillars, which extend downward from the roof rail in a vehicle up-down direction; and an outer member, which covers outer sides of the roof rail and the pillars in a vehicle width direction. The outer member is formed with inclined sides that are inclined upward in the vehicle up-down direction and toward a door opening side.

In an embodiment of the disclosure, a seal member is disposed on an outer side of the outer member in the vehicle width direction, the outer member includes an extending surface, the inclined side is formed at a lower end of the extending surface in the vehicle up-down direction, and the seal member at least partially overlaps the extending surface.

In an embodiment of the disclosure, the extending surface includes an inner extending surface and an outer extending surface, the inner extending surface extends along an end section of the door opening side, and the outer extending surface extends from the inner extending surface toward an outer side which is away from the door opening side and toward the vehicle width direction.

In an embodiment of the disclosure, the seal member includes an inner seal member and an outer seal member. The inner sealing is installed around the door opening along the inner extending surface. The outer seal member is installed around a door where the outer extending surface is exposed when the door is closed.

In an embodiment of the disclosure, the pillars include a front pillar and a center pillar. The outer member is formed with a front cutout section notched corresponding to an upper section of the front pillar, and the outer member is formed with a center cutout section notched corresponding to an upper section of the center pillar. The inclined sides are formed in the front cutout section and the center cutout section.

In an embodiment of the disclosure, the outer member further includes an outer extension surface, and the outer extension surface is formed at a place farther from the door opening side than the extending surface. The front cutout section includes a cut side and a convex section. The cut side is formed at a lower end of the outer extension surface in the vehicle up-down direction, the convex section is formed lower than the cut side and the inclined side and protrudes, and the convex section is formed at a place farther from the door opening side than the seal member.

In an embodiment of the disclosure, the outer extension surface is formed at a place farther from the door opening side than the outer extending surface, and the outer extension surface extends toward an inner side in the vehicle width direction. A ridge line is formed between the outer extending surface and the outer extension surface, and the ridge line is formed to extend toward the convex section.

In an embodiment of the disclosure, the outer member further includes an outer extension surface, and the outer extension surface is formed at a place farther from the door opening side than the extending surface. The center cutout section includes a cut side and an up-down side. The cut side is formed at a lower end of the outer extension surface in the vehicle up-down direction, the up-down side is formed on the outer extension surface between the inner extending surface and the outer extending surface, and the up-down side is connected between the inclined side of the inner extending surface and the inclined side of the outer extending surface. The up-down side is inclined upward in the vehicle up-down direction and toward an outer side in the vehicle width direction.

In an embodiment of the disclosure, in the center cutout section, the outer seal member covers the outer extending surface and the outer extension surface partially adjacent to the outer extending surface.

Based on the above, in the side structure of the vehicle of the disclosure, the outer member is formed with the inclined sides that are inclined upward and toward the door opening side. As a result, water flows downward along the outer member from above, collects at the end section of the outer member, and then flows out through the inclined side toward a lower side away from the door opening side. In this way, water does not flow into the gaps between the outer member and the pillar or other elements. Accordingly, the side structure of the vehicle of the disclosure is capable of preventing water from entering the interior of the cabin.

In order to make the above-mentioned features and advantages of the disclosure comprehensible, embodiments accompanied with drawings are described in detail as follows.

DESCRIPTION OF THE EMBODIMENTS

Figure 1:
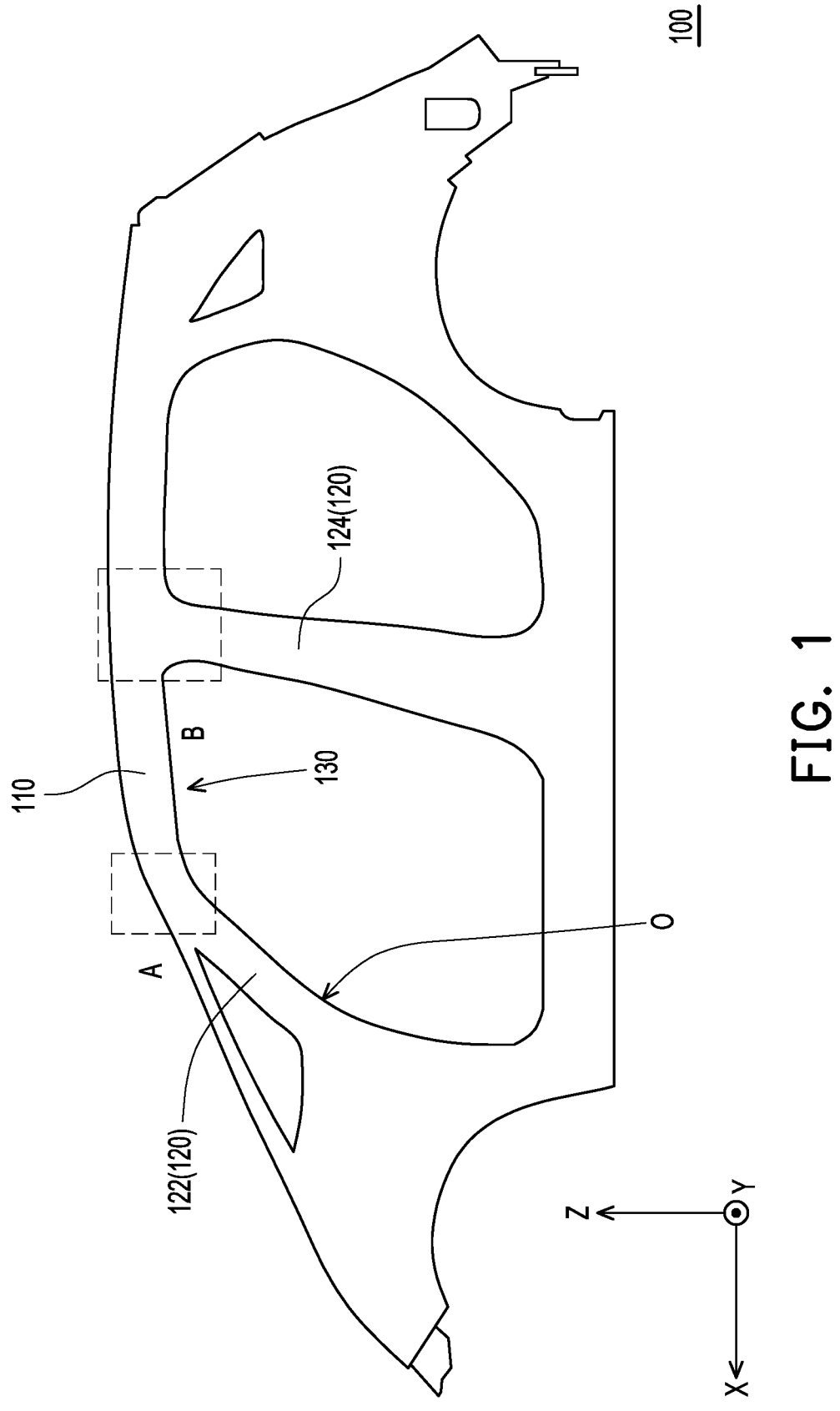
FIG. 1 is a schematic diagram of a side structure of a vehicle according to an embodiment of the disclosure.
Figure 2A:
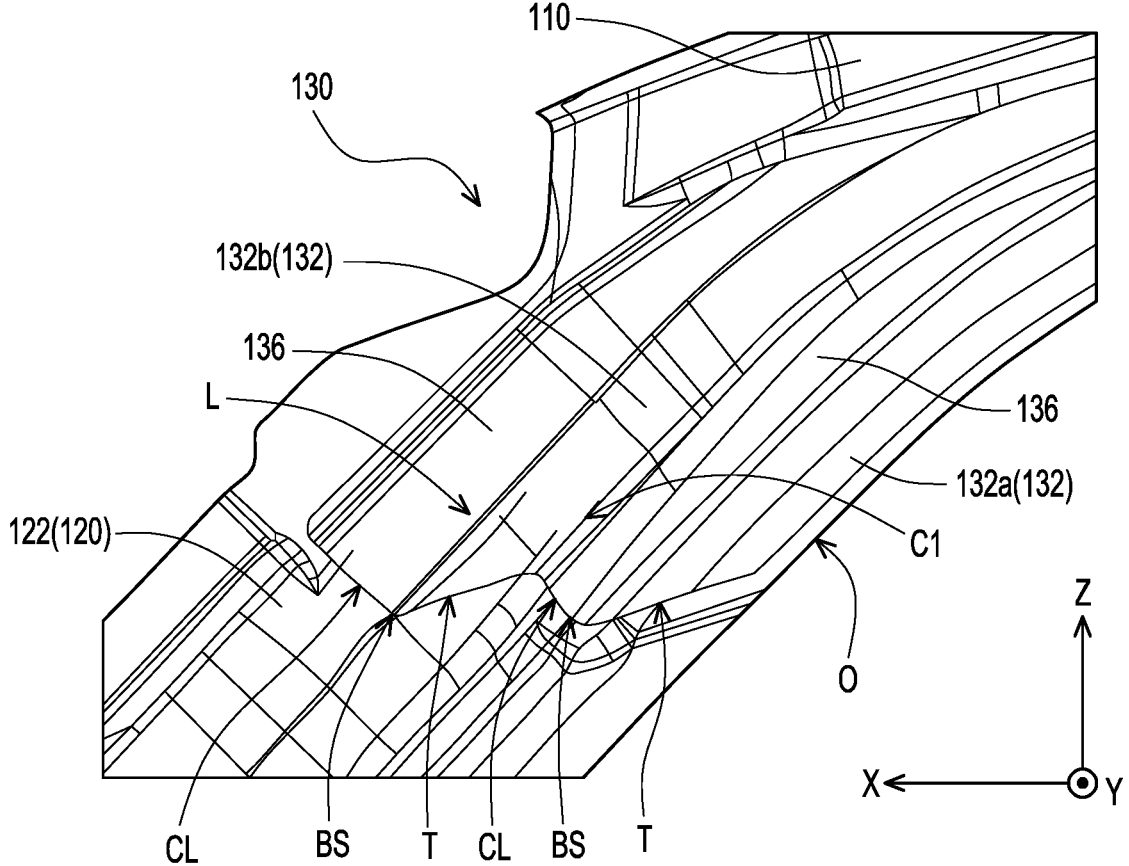
FIGS. 2A and 2B are enlarged schematic views of area A of the side structure of the vehicle in FIG. 1.
Figure 2B:
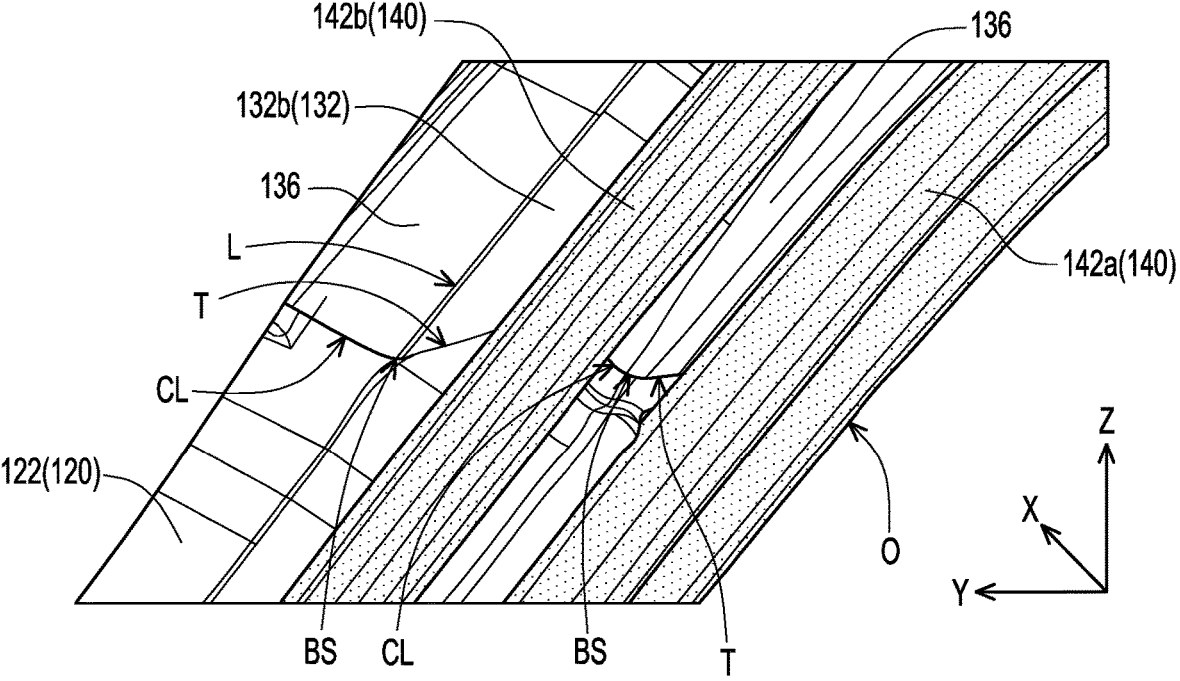
Figure 3A:
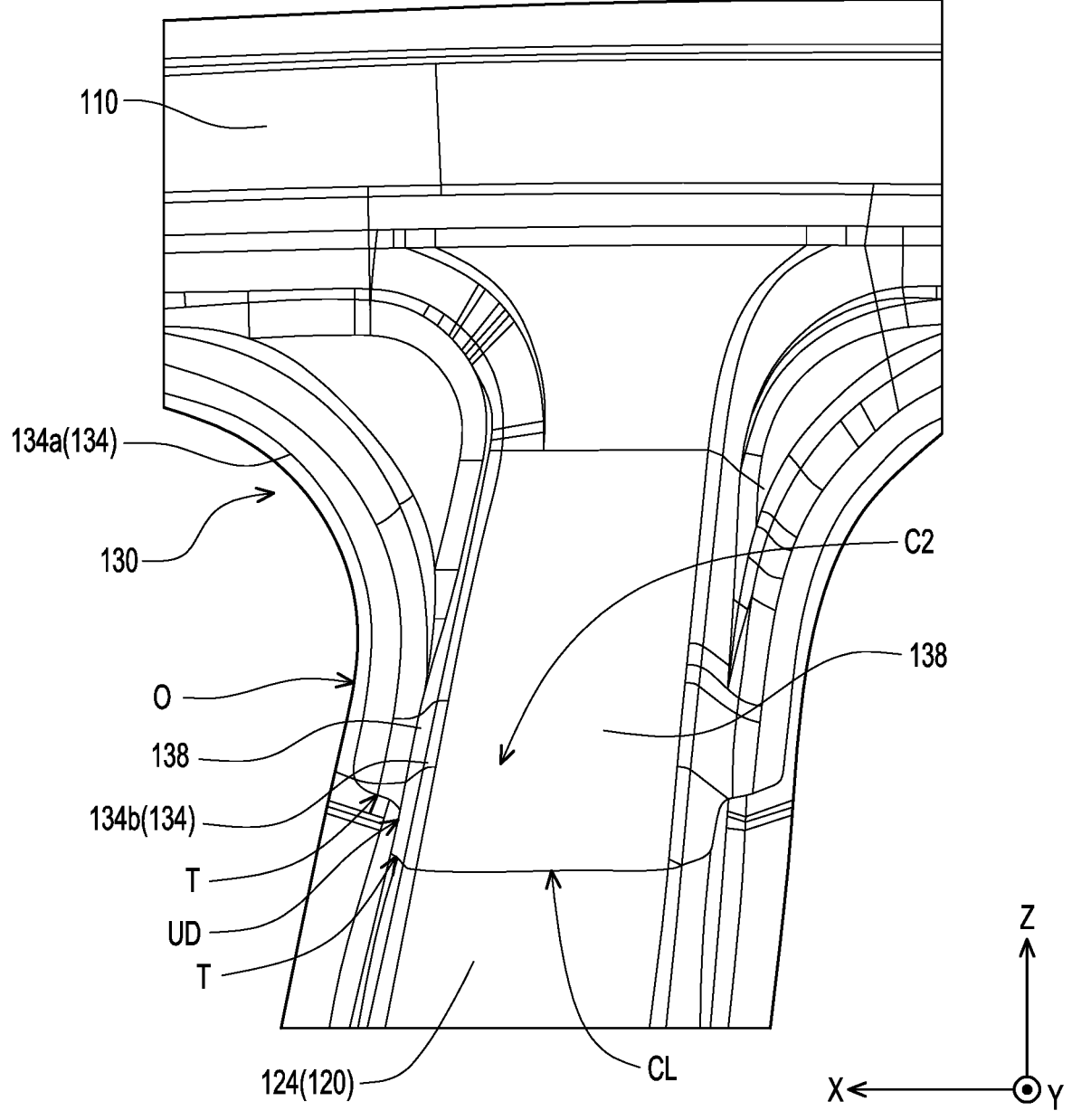
FIGS. 3A and 3B are enlarged schematic views of area B of the side structure of the vehicle in FIG. 1.
Figure 3B:
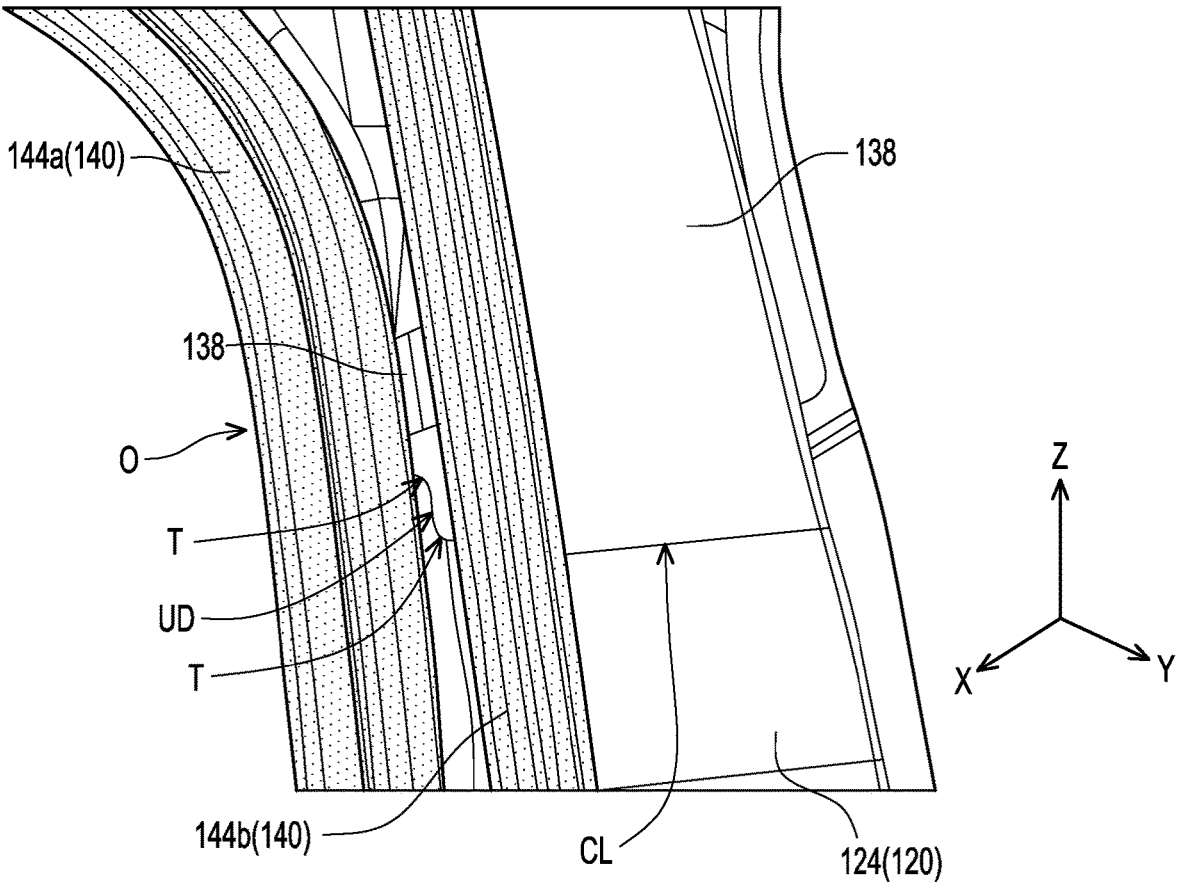

FIG. 1 is a schematic diagram of a side structure of a vehicle according to an embodiment of the disclosure. FIGS. 2A and 2B are enlarged schematic views of area A of the side structure of the vehicle in FIG. 1. FIGS. 3A and 3B are enlarged schematic views of area B of the side structure of the vehicle in FIG. 1. In the embodiment, a side structure of a vehicle 100 is a side structure applied to an ordinary passenger car (not shown), but the disclosure is not limited thereto, and may also be a side structure in other vehicles. A vehicle front-rear direction X, a vehicle width direction Y, a vehicle up-down direction Z, etc. in the drawings are not intended to limit the positional relationship of each of components in the disclosure. In addition, it should be noted that, unless otherwise specified, the front and upper used in the following description are the directions pointed by arrows of the vehicle front-rear direction X and the vehicle up-down direction Z, and the rear and lower used in the description are the opposite directions of the aforementioned. An inner side and an outer side used in the description are relative positions in the vehicle width direction Y. The direction pointed by the arrow of the vehicle width direction Y is not used to limit the inner side or the outer side. Wherever possible, the same reference numerals are used in the drawings and descriptions to refer to the same or similar parts. The specific structure of the side structure of the vehicle 100 of the embodiment is to be described below with reference to FIGS. 1 to 3B.

Referring to FIGS. 1, 2A and 3A, in the embodiment, the side structure of the vehicle 100 includes a roof rail 110, pillars 120 and an outer member 130. The roof rail 110 is disposed on an outer upper section of the vehicle and extends along the vehicle front-rear direction X. The pillars 120 extend from the roof rail 110 downward in the vehicle up-down direction Z, and are formed in the plural, but the disclosure is not limited thereto. The outer member 130 covers outer sides of the roof rail 110 and the pillars 120 in the vehicle width direction Y. As shown in FIGS. 2A and 3A (partial enlarged views of the pillars 120 of two places), specifically, the outer member 130 is formed with inclined sides T that are inclined upward in the vehicle up-down direction Z and toward a door opening O side at an upper section corresponding to the pillar 120. In other words, the inclined side T is formed to be inclined downward as the inclined side T moves away from a door opening O.

It can be seen from this that in the side structure of the vehicle 100 of the embodiment, the outer member 130 is formed with the inclined sides T that are inclined upward and toward the door opening O side. As a result, water flows downward along the outer member 130 from above, collects at an end section of the outer member 130, and then flows out through the inclined side T toward a lower side away from the door opening O side. In this way, water does not flow into gaps between the outer member 130 and the pillar 120 or other elements. Accordingly, the side structure of the vehicle 100 of the embodiment is capable of preventing water from entering an interior of a cabin.

Referring to FIGS. 2A to 3B, furthermore, in the embodiment, a seal member 140 is disposed on an outer side of the outer member 130 in the vehicle width direction Y. The outer member 130 includes an extending surface 132, an extending surface 134 (as shown in FIG. 3A), an outer extension surface 136, and an outer extension surface 138 (as shown in FIG. 3A). The extending surface 132 and the extending surface 134 are formed with the inclined sides T at lower ends in the vehicle up-down direction Z. The outer extension surface 136 and the outer extension surface 138 are formed at places farther from the door opening O side than the extending surface 132 and the extending surface 134. Moreover, the seal member 140 at least partially overlaps the extending surface 132. As a result, water flows from the outer extension surface 136 and the outer extension surface 138 to the extending surface 132 and the extending surface 134, and then is guided to outer sides through the inclined sides T located at end sections of the extending surface 132 and the extending surface 134, thereby preventing water from approaching the seal member 140 and flowing into the gap between the outer member 130 and the seal member 140.

In addition, in the embodiment, the pillars 120 include a front pillar 122 and a center pillar 124. As shown in FIG. 2A, the outer member 130 is formed with a front cutout section C1 notched corresponding to an upper section of the front pillar 122. As shown in FIG. 3A, the outer member 130 is formed with a center cutout section C2 notched corresponding to an upper section of the center pillar 124. Moreover, the inclined sides T are formed in the front cutout section C1 and the center cutout section C2. That is, the front cutout section C1 cuts through the lower ends of the extending surface 132 and the outer extension surface 136 in the vehicle up-down direction Z, and the center cutout section C2 cuts through the lower ends of the extending surface 134 and the outer extension surface 138 in the vehicle up-down direction Z. By disposing the cutout sections, the weight of the outer member 130 can be reduced, and the inclined sides T in the front cutout section C1 and the center cutout section C2 can further guide water away from the side of the cabin to prevent water intrusion.

The structure of the portion of the outer member 130 corresponding to the front pillar 122 is to be described in detail below.

Referring to FIG. 2A, in the embodiment, the extending surface 132 includes an inner extending surface 132*a* and an outer extending surface 132*b*. The inner extending surface 132*a* extends along an end section of the door opening O side. The outer extending surface 132*b* extends from the inner extending surface 132*a* toward an outer side which is away from the door opening O side and toward the vehicle width direction Y. As a result, the inner extending surface 132*a* and the outer extending surface 132*b* can suppress water intrusion. Moreover, the disposition of the inner extending surface 132*a* and the outer extending surface 132*b* can prevent interference occurred when the door (not shown) is opened and closed.

Referring to FIG. 2B, in the embodiment, the seal member 140 includes an inner seal member 142*a* and an outer seal member 142*b*. The inner seal member 142*a* is installed around the door opening O along the inner extending surface 132*a*. The outer seal member 142*b* is installed around the door where the outer extending surface 132*b* is exposed when the door is closed. Since the door and the corners around the door opening O are easily in contact with a user, providing the seal member 140 which is elastic can not only protect the user, but also prevent water from intruding into the interior of the cabin. In other embodiments not shown, the seal member 140 may also be a non-elastic member, and is not limited by the disclosure.

Referring to FIGS. 2A and 2B, further, in the embodiment, the front cutout section C1 includes a cut side CL and a convex section BS. The cut side CL is formed at the lower end of the outer extension surface 136 in the vehicle up-down direction Z, and the cut side CL is formed to extend along an extension direction perpendicular to the outer extension surface 136, but the disclosure is not limited thereto. The convex section BS is formed lower than the cut side CL and the inclined side T and protrudes, and the convex section BS is formed at a place farther from the door opening O side than the seal member 140 (see FIG. 2B). For example, the convex section BS of the embodiment is illustrated as two, and the two convex sections BS are respectively formed at places of the inner seal member 142a and the outer seal member 142b away from the door opening O side. However, the number of the convex sections BS of the disclosure is not limited to two, and may also be single or three and above, depending on actual needs. Since a gap (not shown) exists between the convex section BS and the seal member 140, such a disposition may ensure that when flowing down from above, water is collected into the convex section BS through the inclined side T and discharged to the outer side of the vehicle, and is not affected by wind or the like and intrudes into the gap between the convex section BS and the seal member 140.

In addition, in the embodiment, the outer extension surface 136 is illustrated as two surfaces, and the two outer extension surfaces 136 are respectively formed at places farther from the door opening O side than the inner extending surface 132a and the outer extending surface 132b. However, the number of the outer extension surfaces 136 of the disclosure is not limited to two surfaces, and may also be a single surface or three surfaces and above, depending on actual needs. As shown in FIG. 2B, the outer extension surface 136 extends toward the inner side in the vehicle width direction Y, and a ridge line L is formed between the outer extending surface 132b and the outer extension surface 136. The ridge line L is formed to extend toward the convex section BS. Accordingly, water may reliably flow downward from the outer extension surface 136, collect along the ridge line L toward the convex section BS, and then be discharged from the convex section BS.

The structure of the portion of the outer member 130 corresponding to the center pillar 124 is to be described in detail below.

Referring to FIG. 3A, in the embodiment, the extending surface 134 includes an inner extending surface 134a and an outer extending surface 134b. The inner extending surface 134a extends along an end section of the door opening O side. The outer extending surface 134b extends from the inner extending surface 134a toward an outer side which is away from the door opening O side and toward the vehicle width direction Y. The function of the extending surface 134 is the same as the function of the extending surface 132, and is not described again here.

Referring to FIG. 3B, in the embodiment, the seal member 140 includes an inner seal member 144a and an outer seal member 144b. The inner seal member 144a is installed around the door opening O along the inner extending surface 134a. The outer seal member 144b is installed around the door where the outer extending surface 134b is exposed when the door is closed. The functions of the inner seal member 144a and the outer seal member 144b are the same as the functions of the inner seal member 142a and the outer seal member 142b, and are not described again here.

Referring to FIGS. 3A and 3B, further, in the embodiment, the central cutout section C2 includes a cut side CL and an up-down side UD. The cut side CL is formed at the lower end of the outer extension surface 138 in the vehicle up-down direction Z, and the cut side CL is formed to extend along an extension direction perpendicular to the outer extension surface 138, but the disclosure is not limited thereto. The up-down side UD is formed on the outer extension surface 138 between the inner extending surface 134a and the outer extending surface 134b, and the up-down side UD is connected between the inclined side T of the inner extending surface 134a and the inclined side T of the outer extending surface 134b. Furthermore, the up-down side UD is inclined upward in the vehicle up-down direction Z and toward an outer side in the vehicle width direction Y. That is, the up-down side UD extends in a direction substantially perpendicular to the extension direction of the inclined side T. In this way, when water flows along the inclined side T, the up-down side UD changes the flow direction, so that water is discharged downward along the up-down side UD. Furthermore, since the inclined direction of the up-down side UD is substantially opposite to the inclined side T, the amount of water flowing to the outer seal member 144b is reduced, further preventing water from intruding into the gap between the outer member 130 and the seal member 140.

In addition, in the embodiment, the outer extension surface 138 is illustrated as two surfaces, and the two outer extension surfaces 138 are respectively formed at places farther from the door opening O side than the inner extending surface 134a and the outer extending surface 134b. However, the number of the outer extension surfaces 138 of the disclosure is not limited to two surfaces, and may also be a single surface or three surfaces and above, depending on actual needs. The outer seal member 144b covers the outer extending surface 134b and the outer extension surface 138 partially adjacent to the outer extending surface 134b. With such a disposition, water from the outer side of the vehicle may be blocked by the outer extending surface 134b and the outer seal member 144b and flow out downward. Even if water sneaks into the gap between the outer member 130 and the seal member 140, water may be discharged through the inclined side T of the outer extending surface 134b, which prevents water from intruding into the interior of the cabin.

In summary, in the side structure of the vehicle of the disclosure, the outer member is formed with the inclined sides that are inclined upward and toward the door opening side. As a result, water flows downward along the outer member from above, collects at the end section of the outer member, and then flows out through the inclined side toward a lower side away from the door opening side. This way, water does not flow into the gap between the outer member and the pillar. In addition, the seal member is disposed on the outer side of the outer member in the vehicle width direction, and the outer member includes the extending surface and the outer extension surface. The inclined side is formed at the lower end of the extending surface in the vehicle up-down direction, and the outer extension surface is farther away from the door opening side than the extending surface. Furthermore, the seal member at least partially overlaps the extending surface. Therefore, water flows from the outer extension surface to the extending surface, and is then guided to the outer side through the inclined side located at the end section of the extending surface, thereby preventing water from approaching the seal member and flowing into the gap between the outer member and the seal member. Accordingly, the side structure of the vehicle of the disclosure is capable of preventing water from entering the interior of the cabin.

Finally, it should be noted that the above embodiments are only used to illustrate the technical solutions of the disclosure, but not to limit the technical solutions of the disclosure. Although the disclosure has been described in detail with reference to the foregoing embodiments, those of ordinary skill in the art should understand that the technical solutions described in the foregoing embodiments may still be modified, or some or all of the technical features thereof may be equivalently replaced. However, these modifications or substitutions do not make the essence of the corresponding technical solutions deviate from the scope of the technical solutions of the embodiments of the disclosure.

What is claimed is:

1. A side structure of a vehicle, comprising:

a roof rail, disposed on an outer upper section of the vehicle and extending along a vehicle front-rear direction;

pillars, extending downward from the roof rail in a vehicle up-down direction; and an outer member, covering outer sides of the roof rail and the pillars in a vehicle width direction, wherein the outer member is formed with inclined sides that are inclined upward in the vehicle up-down direction and toward a door opening side.

2. The side structure of the vehicle according to claim 1, wherein a seal member is disposed on an outer side of the outer member in the vehicle width direction, the outer member comprises an extending surface, and the inclined side is formed at a lower end of the extending surface in the vehicle up-down direction, and the seal member at least partially overlaps the extending surface.

3. The side structure of the vehicle according to claim 2, wherein the extending surface comprises an inner extending surface and an outer extending surface, the inner extending surface extends along an end section of the door opening side, and the outer extending surface extends from the inner extending surface toward an outer side which is away from the door opening side and toward the vehicle width direction.

4. The side structure of the vehicle according to claim 3, wherein the seal member comprises an inner seal member and an outer seal member, the inner seal member is installed around the door opening along the inner extending surface, and the outer seal member is installed around a door where the outer extending surface is exposed when the door is closed.

5. The side structure of the vehicle according to claim 3, wherein the pillars comprise a front pillar and a center pillar, the outer member is formed with a front cutout section notched corresponding to an upper section of the front pillar, and the outer member is formed with a center cutout section notched corresponding to an upper section of the center pillar, and the inclined sides are formed in the front cutout section and the center cutout section.

6. The side structure of the vehicle according to claim 5, wherein the outer member further comprises an outer extension surface, and the outer extension surface is formed at a place farther from the door opening side than the extending surface, the front cutout section comprises a cut side and a convex section, the cut side is formed at a lower end of the outer extension surface in the vehicle up-down direction, and the convex section is formed lower than the cut side and the inclined side and protrudes, and the convex section is formed at a place farther from the door opening side than the seal member.

7. The side structure of the vehicle according to claim 6, wherein the outer extension surface is formed at a place farther from the door opening side than the outer extending surface, and the outer extension surface extends toward an inner side in the vehicle width direction, a ridge line is formed between the outer extending surface and the outer extension surface, and the ridge line is formed to extend toward the convex section.

8. The side structure of the vehicle according to claim 5, wherein the outer member further comprises an outer extension surface, and the outer extension surface is formed at a place farther from the door opening side than the extending surface, the center cutout section comprises a cut side and an up-down side, the cut side is formed at a lower end of the outer extension surface in the vehicle up-down direction, the up-down side is formed on the outer extension surface between the inner extending surface and the outer extending surface, and the up-down side is connected between the inclined side of the inner extending surface and the inclined side of the outer extending surface, and the up-down side is inclined upward in the vehicle up-down direction and toward an outer side in the vehicle width direction.

9. The side structure of the vehicle according to claim 8, wherein in the center cutout section, the outer seal member covers the outer extending surface and the outer extension surface partially adjacent to the outer extending surface.

* * * * *